United States Patent [19]

Green

[11] Patent Number: 4,992,496

[45] Date of Patent: Feb. 12, 1991

[54] FLAME RETARDANT MODIFIED POLYPHENYLENE OXIDE COMPOSITION

[75] Inventor: Joseph Green, East Brunswick, N.J.

[73] Assignee: FMC Corporation, Philadelphia, Pa.

[21] Appl. No.: 92,854

[22] Filed: Sep. 3, 1987

[51] Int. Cl.$^5$ .............................................. C08K 5/527
[52] U.S. Cl. .................................... 524/109; 524/114; 524/142; 524/469; 524/468
[58] Field of Search ............... 524/142, 114, 109, 469, 524/468; 525/68; 521/98

[56] References Cited

U.S. PATENT DOCUMENTS

| | | | |
|---|---|---|---|
| 2,530,353 | 11/1950 | Havens | 524/109 |
| 2,564,194 | 8/1951 | de Nie et al. | 524/109 |
| 2,585,506 | 2/1952 | Shokal et al. | 524/109 |
| 2,862,904 | 12/1958 | Mullins | 524/109 |
| 3,639,506 | 2/1972 | Haaf | 525/68 |
| 3,652,494 | 3/1972 | Baker | 524/109 |
| 3,912,792 | 10/1975 | Touval | 524/109 |
| 4,010,219 | 3/1977 | Aoyama et al. | 260/835 |
| 4,446,272 | 5/1984 | Fukuda et al. | 525/68 |
| 4,456,719 | 6/1984 | Yamamoto et al. | 524/114 |
| 4,530,952 | 7/1985 | Tayama et al. | 524/159 |

FOREIGN PATENT DOCUMENTS 48-04374 2/1973 Japan.

OTHER PUBLICATIONS

Kirk-Othmer, *Encyclopedia of Chemical Technology*, 3rd Ed., vol. 12, John Wiley & Sons, N.Y. (1980), pp. 225-229.
Gachter et al., Plastics Additives Handbook, Hanser Publishers, Munich.
Ferro Chemicals Brochure, PLAS-CHEK 775 Epoxidized Soybean Oil.

*Primary Examiner*—Veronica P. Hoke
*Attorney, Agent, or Firm*—R. E. Elden; R. L. Andersen

[57] ABSTRACT

It was unexpectedly found that a brominated phosphate ester, tris(2,4-dibromophenyl)phosphate when employed in flame retardant quantities in a modified polyphenylene oxide resin resulted in discoloration of the resin on aging. Neither phosphate esters, flame retardants nor brominated flame retardants when employed separately as flame retardants caused similar discoloration. The use of epoxy compounds counteracted this color stability problem.

6 Claims, No Drawings

FLAME RETARDANT MODIFIED POLYPHENYLENE OXIDE COMPOSITION

The present invention is a modified polyphenylene oxide resin composition containing a brominated phosphate ester as a flame retardant. The composition has a reduced tendency to discolor when aged.

Polyphenylene oxide (also called polyphenylene ether) when combined with polystyrene forms a family of thermoplastic engineering resins called modified polyphenylene oxide. The compositions can be varied to adjust the mechanical properties of the finished resin product and vary the processability of the resin for injection molding and extruding and the like.

Polyphenylene oxide is produced from the oxidative coupling polymerization of 2,6-dimethylphenol. It is a linear amorphous polymer with a glass transition temperature of about 210° C.

Flame retardant grades of polyphenylene oxide resins modified with polystyrene can be produced by incorporating conventional additives. Examples include brominated polystyrene, phosphate esters and an oligomer of tetrabromobisphenol A.

Recently a flame retardant polybromophenyl phosphate additive has been proposed in U.S. Pat. No. 4,710,530 for modified polyphenylene oxide, in particular, tris(2,4-dibromophenyl)phosphate. These flame retardants have low volatility and contain both phosphorus and bromine.

Unexpectedly it has been found that the color stability of a modified polyphenylene oxide resin containing a flame retardant amount of a brominated phosphate ester may be significantly improved by incorporating a color stabilizing amount of an epoxy compound. The improvement in color stability is clearly evident in accelerated aging tests at elevated temperatures. Color stability is particularly important when the resin composition is fabricated into a decorative article.

The present invention is a flame retarded polyphenylene oxide composition comprising a polystyrene modified polyphenylene oxide resin, a flame retardant amount of a polybrominated aryl phosphate ester, and a sufficient quantity of an epoxy compound to enhance the color stability of the flame retarded polyphenylene oxide composition.

Other conventional additives for modified polyphenylene oxide resins may be incorporated into the flame retarded polyphenylene oxide composition without adversely affecting the flame retardancy or color stability of the modified polyphenylene oxide resin. These additives include stabilizers, fillers, foaming agents and the like.

Generally it is desirable to incorporate up to 15 phr (parts per hundred parts of resin) of the polybrominated aryl phosphate into the modified polyphenylene oxide resin. Although more than 15 phr of the polybrominated aryl phosphate is effective, amounts in excess of 15 phr are usually not necessary to obtain a V-0 rating.

A particularly desirable polybrominated aryl phosphate ester is tris(2,4-dibromophenyl)phosphate.

Any epoxy compound suitable for incorporation into a polymeric resin appears to be effective in improving the color stability of the flame retarded modified polyphenylene oxide. Examples include such extremes as epoxidized soybean oil, epoxidized linseed oil and 3,4-epoxycyclohexyl methyl-3,4-epoxy cyclohexane carboxylate, a diepoxide. The efficacy of the epoxide employed appears to be proportional to the oxirane content. Therefore, one skilled in the art can readily determine the optional composition for any particular application by balancing the effect of the cost of the epoxide, the oxirane content of the epoxide and the effect of the epoxide on the other physical properties of the modified polyphenylene oxide resin. It is generally desirable to add an epoxy compound containing 6% to 12% oxirane oxygen at a rate of 1 phr to 5 phr.

Epoxy compounds are normally employed in polyvinyl compounds as plasticizers and stabilizers. However, until the present invention there has been no suggestion to employ epoxides for any purpose in modified polyphenylene oxide resins.

The best mode for practicing the present invention will be clear to one skilled in the art from the following nonlimiting examples.

Color was measured as the yellowness index by a reflective spectrophotometer (Elrepho 2000) manufactured by Carl Zeiss Co.

EXAMPLE A

The color instability problem is illustrated in Table I. The yellowness index of modified polyphenylene oxide compositions formulated with 12 phr (12 parts of flame retardant per hundred parts of resin) of different flame retardants was determined before and after accelerated aging at 115° C. The flame retardants employed were: an alkylated triarylphosphate ester (TAP), brominated polystyrene, a polycarbonate oligomer of tetrabromobisphenol A (BPAC), tris(2,4-dibromophenyl)phosphate (TDBP), and bis(tribromophenoxy)ethane (BTBE). Table I shows that the composition initially was significantly yellower than the comparative compositions. After six days at 115° C. the TDBP composition had further increased in yellowness compared with the comparative compositions.

EXAMPLE 1

Compositions of modified polyphenylene oxide (G.E. Noryl ENG-265) with 12 phr TDBP were prepared with various commercial stabilizers as additives and with several epoxides in a screening test. The yellowness index was determined as in Example A. Compositions and results are presented as Table II. Tradenames and common abbreviations of additives follow:

DPDP—Diphenyl isodecyl phosphite (Borg-Warner Corporation),
TRIBASE EXL—Modified tribasic lead sulfate (National Lead Company),
TEA—Triethanolamine,
Naugard 445—Aromatic amine antioxidant (Uniroyal Chemical),
Naugard SP—Antioxidant (Uniroyal Chemical),
Irganox 1010—Hindered phenol antioxidant (Ciba-Geigy Corporation)
AM 545—Stabilizer for halogen containing polymers (Ferro Corporation),
Ferro 75001—Ba/Cd stabilizer (Ferro Corporation),
$B_2O_3$—Boric oxide,
ESO—Epoxidized soybean oil,
ERL-4221—3,4-epoxycyclohexyl methyl3,4-epoxy cyclohexane carboxylate (Union Carbide Corporation),
$TiO_2$—Titanium dioxide,
$CaCo_3$—Calcium carbonate,
MgO—Magnesium oxide, and
ZnO—Zinc oxide.

From Table II it is clear that ERL-4221 reduces yellowness on both the initial and aged samples. Samples 16-18 suggest the ESO also has some benefit.

EXAMPLE 2

The effect of the ERL-4221 diepoxide on color stability was confirmed in a test after aging 26 days at 80° C. Compositions and results are presented as Table III.

EXAMPLE 3

Example 2 was repeated with the compositions being aged 16 days at 95° C. and 11 days at 115° C. Results are presented as Table IV. A polycarbonate oligomer of tetrabromobisphenol A (BPAC) was also included.

EXAMPLE 4

Example 2 was repeated at 80° C. and 115° C. The example demonstrates that 0.5 phr DPDP is ineffective compared with 3 phr diepoxide on the color stability of tris(2,4-dibromophenyl)phosphate. Results are presented as Table V. These data show the DPDP (phosphite) to be ineffective.

EXAMPLE 5

Yellowness indices were determined using GE Noryl PX 844 modified polyphenylene oxide and a variety of flame retardants and stabilizers. Results are presented as Table VI. These data show that both epoxidized soybean oil and the ERL-4221 diepoxide are effective stabilizers.

EXAMPLE 6

Various epoxy compounds were employed as color stabilizer for GE Noryl ENG-265 polyphenylene oxide containing 12 phr tris(2,4-dibromophenyl)phosphate. Additives and results are presented as Table VII. This example shows the efficacy of the epoxy compound is proportional to its oxirane content.

EXAMPLE 7

ESO containing 6.8% oxirane oxygen at 1,3 and 5 phr and 3 phr diepoxide with an 11-12% oxirane oxygen were compared in a Noryl ENG-265 polyphenylene oxide composition containing 12 phr tris(2,4-dibromophenyl)phosphate. Results are presented as Table VIII.

TABLE I

COLOR OF MODIFIED POLYPHENYLENE OXIDE COMPOSITIONS AGED AT 115° C. CONTAINING 12 PHR FLAME RETARDANTS

| | Yellowness Index | |
|---|---|---|
| | Initial | 60 Days |
| Alkylated Triarylphosphate | 12.5 | 18.5 |
| Brominated Polystyrene | 16.3 | 25.2 |
| Bis(tribromophenoxy)ethane | 15.5 | 24.7 |
| Tris(2,4-dibromophenyl)phosphate | 22.7 | 36.5 |

TABLE II

COLOR ON AGING AT 115° C. OF MODIFIED POLYPHENYLENE OXIDE WITH 12 PHR TRIS (2,4-DIBROMOPHENYL)PHOSPHATE

| Sample No. | Additive phr | Trade Designation | Yellowness Initial | 8 Day | 12 Day |
|---|---|---|---|---|---|
| 1 | 0 | CONTROL | 20.7 | 33.4 | 39.2 |
| 2 | 1 | TiO$_2$ | 21.2 | 33.5 | 38.5 |
| 3 | 1 | CaCo$_3$ | 22.4 | 33.8 | 38.0 |
| 4 | 0.5 | MgO | 18.9 | 34.5 | 51.2 |
| 5 | 0.3 | ZnO | 20.8 | 36.7* | — |
| 6 | 0.3 | ZnO | | | |
| | 0.5 | DPDP | 20.0 | 36.6* | — |
| 7 | 1 | B$_2$O$_3$ | 24.5 | 33.9 | 41.2 |
| 8 | 1 | Tribase EXL | 15.6 | 32.5 | 36.0 |
| 9 | 1 | B$_2$O$_3$ | | | |
| | 1 | TEA | 20.4 | 33.5 | 39.1 |
| 10 | 1 | Naugard 445 | 20.5 | 36.7 | 39.2 |
| 11 | 0.5 | DPDP | | | |
| | 0.5 | Irganox 1010 | 16.8 | 35.7 | 41.0 |
| 12 | 0.5 | DPDP | | | |
| | 0.5 | Naugard SP | 21.5 | 37.8 | 41.8 |
| 13 | 0.5 | DPDP | | | |
| | 2 | B$_2$O$_3$ | 18.6 | 31.7 | 38.9 |
| 14 | 0.5 | DPDP | | | |
| | 0.5 | Irganox 1010 | | | |
| | 1 | Naugard 445 | 16.3 | 32.3 | 38.7 |
| 15 | 0.5 | DPDP | | | |
| | 0.5 | Irganox 1010 | | | |
| | 1 | Naugard 445 | | | |
| | 1 | TiO$_2$ | 20.7 | 35.7 | 40.1 |
| 16 | 3 | ESO | 19.1 | 34.8 | 40.6 |
| | 0.5 | DPDP | | | |
| | 0.5 | Irganox 1010 | | | |
| | 1 | Naugard 445 | | | |
| | 1 | TiO$_2$ | 20.7 | 35.7 | 40.1 |
| 17 | 3 | ESO | 18.1 | 26.7 | 44.6 |
| | 1 | Ferro-75001 | | | |
| | 0.5 | DPDP | | | |
| | 0.5 | Irganox 1010 | | | |
| | 1 | Naugard 445 | | | |
| | 1 | TiO$_2$ | 20.7 | 35.7 | 40.1 |
| 18 | 3 | ESO | | | |
| | 1 | AM-545 | 13.5 | 29.3 | 40.0 |
| 19 | 3 | ERL-4221 | 13.9 | 22.2 | 27.7 |

*6 days

TABLE III

COLOR OF MODIFIED POLYPHENYLENE OXIDE COMPOSITIONS AGED AT 80° C.

| | Yellowness Index | |
|---|---|---|
| Additive | Initial | 26 Days |
| 12 phr Triarylphosphate | 11.3 | 17.4 |
| 12 phr Brominated Polycarbonate (BPAC) | 15.3 | 17.9 |
| 12 phr TDBP | 16.2 | 23.4 |
| 12 phr TDBP and 3 phr ERL-4221 | 11.4 | 16.7 |

TABLE IV

COLOR OF MODIFIED POLYPHENYLENE OXIDE COMPOSITIONS AGED AT 95° C. AND 115° C.

| | Yellowness Index | | |
|---|---|---|---|
| Additive | Initial | 6 Days at 95° C. | 11 Days at 115° C. |
| 12 phr Triarylphosphate | 10.8 | 17.3 | — |
| 12 phr Tetrabromobisphenol A Oligomer | 13.4 | 17.0 | 23.8 |
| 12 phr Brominated Polystyrene | 13.7 | 20.0 | 25.3 |
| 12 phr TDBP | 15.6 | 28.3 | 37.0 |
| 12 phr TDBP and 3 phr ERL | 12.8 | 18.3 | 23.9 |

TABLE V

EFFECT OF EPOXIDE ON THE COLOR STABILITY OF MODIFIED POLYPHENYLENE

| | Yellowness Index | | | |
|---|---|---|---|---|
| Additive | Initial | 33 Days at 80° C. | 10 Days at 95° C. | 6 Days at 115° C. |
| Triarylphosphate | 12 | — | 15 | 19 |
| Brominated Polystyrene | 16 | — | 19 | 25 |
| TDBP | 22 | 33 | 29 | 37 |
| TDBP and 0.5-DPDP | 20 | 32 | 27 | 37 |
| TDBP and 3-ERL-4221 | 13 | 19 | 22 | 23 |

TABLE VI

COLOR STABILITY OF FLAME RETARDANT NORYL PX844 MODIFIED POLYPHENYLENE OXIDE COMPOSITION AND 12 phr TDBP

| 12 phr Flame Retardant | Yellowness Index | | | |
|---|---|---|---|---|
| | Initial | 5 Days | 9 Days | 19 Days |
| Triarylphosphate ester | 23.5 | 25.6 | 30.3 | 33.1 |
| Brominated Polystyrene | 21.7 | 25.7 | 26.1 | 30.6 |
| Tetrabromobisphenol oligomer | 23.4 | 28.7 | 29.3 | 33.8 |
| TDBP | 28.3 | 31.0 | 36.1 | 39.8 |
| TDBP with 1 phr B$_2$O$_3$ | 27.6 | 31.4 | 32.8 | 40.0 |
| TDBP with 3 phr ESO | 15.5 | 21.6 | 25.8 | 32.5 |
| TDBP with 3 phr ERL-4221 | 17.3 | 19.9 | 21.2 | 25.7 |

TABLE VII

COLOR STABILIZATION OF FLAME RETARDED NORYL ENG-265 POLYPHENYLENE OXIDE EPOXY COMPOUNDS AND 12 phr TDBP

| | | Yellowness Index | |
|---|---|---|---|
| Epoxy Compound | Oxirane Oxygen | Initial | 18 Days at 95° C. |
| None | 0 | 15.6 | 28.3 |
| 3 phr Epoxy Soybean Oil | 6.8 | 14.1 | 26.7 |
| 3 phr 828 (Shell) | 7.6 to 9.1 | 16.1 | 24.4 |
| 3 phr Epoxy Linseed Oil | 9 | 17.0 | 24.9 |
| 3 phr ERL-4221 (Union Carbide) | 11 to 12 | 12.8 | 18.3 |

TABLE VIII

COLOR STABILIZATION OF FLAME RETARDED MODIFIED POLYPHENYLENE OXIDE CONTAINING 12 phr TRIS(2,4-DIBROMOPHENYL)PHOSPHATE

| | | Yellowness Index | |
|---|---|---|---|
| Stabilizer | phr | Initial | 32 Days at 80° C. |
| ESO | 1 | 16.6 | 29.8 |
| ESO | 3 | 12.4 | 26.5 |
| ESO | 5 | 12.8 | 21.5 |
| ERL-4221 | 3 | 12.2 | 19.1 |

I claim:

1. A flame retarded polyphenylene oxide composition comprising a polystyrene modified polyphenylene oxide resin, a flame retardant amount of a polybrominated aryl phosphate ester, and a sufficient quantity of an epoxy compound to enhance the color stability of the flame retarded polyphenylene oxide composition.

2. The composition of claim 1 wherein the polybrominated aryl phosphate ester is tris(2,4-dibromophenyl)phosphate.

3. The composition of claim 1 wherein an epoxy compound containing 6% to 12% oxirane oxygen is incorporated at a rate of from 1 phr to 5 phr.

4. The composition of claim 2 wherein an epoxy compound containing 6% to 12% oxirane oxygen is incorporated at a rate of from 1 phr to 5 phr.

5. The composition of claim 1 wherein the flame retarded polyphenylene oxide composition contains up to about 15 phr tris(2,4-dibromophenyl)phosphate.

6. The composition of claim 5 wherein an epoxy compound containing 6% to 12% oxirane oxygen is incorporated at a rate of from 1 phr to 5 phr.

* * * * *